United States Patent
Vannarath et al.

(10) Patent No.: US 12,363,073 B1
(45) Date of Patent: Jul. 15, 2025

(54) SYSTEM AND METHOD FOR ESTABLISHING CRYPTOGRAPHICALLY SECURE TUNNELS

(71) Applicant: AVIATRIX SYSTEMS, INC., Santa Clara, CA (US)

(72) Inventors: Praveen Vannarath, Sunnyvale, CA (US); Xiaobo Sherry Wei, Santa Clara, CA (US)

(73) Assignee: Aviatrix Systems, Inc., Santa Clara, CA (US)

( * ) Notice: Subject to any disclaimer, the term of this patent is extended or adjusted under 35 U.S.C. 154(b) by 904 days.

(21) Appl. No.: 16/812,177

(22) Filed: Mar. 6, 2020

Related U.S. Application Data

(60) Provisional application No. 62/982,675, filed on Feb. 27, 2020.

(51) Int. Cl.
 *H04L 9/40* (2022.01)
 *H04L 12/46* (2006.01)

(52) U.S. Cl.
 CPC ...... *H04L 63/0263* (2013.01); *H04L 12/4633* (2013.01); *H04L 12/4641* (2013.01); *H04L 63/0272* (2013.01); *H04L 63/029* (2013.01); *H04L 63/164* (2013.01)

(58) Field of Classification Search
 CPC ............... H04L 63/0272; H04L 63/029; H04L 12/4633; H04L 12/4641; H04L 45/64; H04L 45/76
 See application file for complete search history.

(56) References Cited

U.S. PATENT DOCUMENTS

| | | | | |
|---|---|---|---|---|
| 9,813,379 | B1 * | 11/2017 | Shevade | H04L 45/24 |
| 10,382,401 | B1 * | 8/2019 | Lee | H04L 63/166 |
| 10,686,758 | B2 * | 6/2020 | Landgraf | H04L 63/0218 |
| 10,749,971 | B2 * | 8/2020 | Gupta | H04L 63/02 |
| 10,880,124 | B2 * | 12/2020 | Cheng | H04L 45/586 |
| 11,140,020 | B1 * | 10/2021 | Baniani | H04L 45/24 |
| 2012/0226792 | A1 * | 9/2012 | Johnson | H04L 63/164 709/223 |

(Continued)

FOREIGN PATENT DOCUMENTS

| | | | | |
|---|---|---|---|---|
| WO | WO-2018222323 A1 * | 12/2018 | | G06F 9/45558 |

*Primary Examiner* — Tae K Kim

(74) *Attorney, Agent, or Firm* — Winstead PC

(57) ABSTRACT

A method for establishing a communication coupling within a cloud computing environment between a first gateway of a first virtual private cloud network deployed behind a firewall and a second gateway of a second virtual private cloud network is disclosed. The method includes operations of receiving, by the first gateway, a first controller message from a controller deployed within the cloud computing environment, the first controller message instructing the first gateway to transmit a first gateway message to the second gateway, transmitting, by the first gateway, the first gateway message to the second gateway, receiving, by the first gateway, a second gateway message from the second gateway, the second gateway message initiating a negotiation to establish a first tunnel between the first gateway and the second gateway in accordance with a first security protocol, and completing, by the first gateway, the negotiation thereby causing establishment of the first tunnel.

20 Claims, 7 Drawing Sheets

(56) References Cited

U.S. PATENT DOCUMENTS

| | | | | |
|---|---|---|---|---|
| 2013/0283364 A1* | 10/2013 | Chang | ............... | G06F 9/45558 |
| | | | | 726/12 |
| 2014/0282817 A1* | 9/2014 | Singer | ............... | H04L 63/08 |
| | | | | 726/1 |
| 2015/0381568 A1* | 12/2015 | Johnson | ............... | H04L 63/04 |
| | | | | 726/15 |
| 2016/0352682 A1* | 12/2016 | Chang | ............... | H04L 67/10 |
| 2017/0060615 A1* | 3/2017 | Thakkar | ............... | H04L 41/08 |
| 2017/0359410 A1* | 12/2017 | Thakkar | ............... | H04L 12/4641 |
| 2018/0060117 A1* | 3/2018 | Maskalik | ............... | G06F 9/4856 |
| 2018/0062920 A1* | 3/2018 | Srinivasan | ............... | G06F 9/5061 |
| 2019/0089641 A1* | 3/2019 | Shattah | ............... | H04L 47/2441 |
| 2019/0089679 A1* | 3/2019 | Kahalon | ............... | H04L 47/20 |
| 2019/0149518 A1* | 5/2019 | Sevinc | ............... | H04L 63/0263 |
| | | | | 726/11 |
| 2019/0182155 A1* | 6/2019 | Chang | ............... | H04L 45/50 |
| 2019/0327112 A1* | 10/2019 | Nandoori | ............... | H04L 43/16 |
| 2020/0059370 A1* | 2/2020 | Abraham | ............... | H04L 45/645 |
| 2020/0067734 A1* | 2/2020 | Hira | ............... | H04L 45/72 |
| 2020/0213225 A1* | 7/2020 | Han | ............... | H04L 47/829 |
| 2020/0351254 A1* | 11/2020 | Xiong | ............... | H04L 12/4633 |
| 2023/0144202 A1* | 5/2023 | Adhav | ............... | H04L 63/0272 |
| | | | | 726/15 |

* cited by examiner

SYSTEM AND METHOD FOR ESTABLISHING CRYPTOGRAPHICALLY SECURE TUNNELS

FIELD

Embodiments of the disclosure relate to the field communications. More specifically, one embodiment of the disclosure relates to a system and method for establishing a cryptographically secure tunnel between a virtual private cloud (VPC) gateway and a transit gateway deployed behind a firewall within a cloud computing environment.

GENERAL BACKGROUND

Over the past few years, cloud computing has provided an Infrastructure as a Service (IaaS), where resources are provided as part of a cloud computing platform (e.g., public cloud network) and made accessible to tenants as a service. One of these services allows tenants to (i) upload software components (e.g., instances of executables such as software applications, virtual machines, etc.) to the cloud computing platform, and subsequently, (ii) run the software components from the cloud computing platform. Hence, the migration of software functionality into cloud computing platforms has led to greater usage of virtual private cloud networks (VPCs).

A virtual private cloud network (VPC) is an on-demand, configurable pool of shared resources allocated within the cloud computing platform, providing a certain level of isolation between the different organizations (hereinafter, "users") using the resources. The isolation between one VPC user and all other users of the same cloud computing platform may be achieved through allocation of a private Internet Protocol (IP) subnet and a virtual communication construct (e.g., virtual local area network "VLAN" or other protected communications) per user. For example, AMAZON WEB SERVICES (AWS®) provides for the purchase of AMAZON® Elastic Compute Cloud (EC2) services with dedicated data processing capabilities for a particular user.

Currently, a cloud computing platform provides connectivity between VPCs. This connectivity, sometimes referred to as "peering," constitutes an establishment of communications between separate VPCs or certain types of computing devices for the purpose of exchanging data traffic between users of each network. One common deployment model is referred to a spoke-hub model in which a central VPC ("hub") communicatively connects to one or more additional VPCs ("spokes"). The hub VPC may establish a secure communication path such as a tunnel (e.g., a direct connection (DX) or an Internet Protocol Security (IPSec) tunnel) with network device, network or a datacenter such that a spoke VPC may be provided access to the network device, network or datacenter through the hub VPC. In a specific example, a tunnel may be established between a gateway deployed within the hub VPC and a gateway deployed in a spoke VPC. In a second specific example, a tunnel may be established between a gateway deployed within the hub VPC and a network device deployed at a datacenter.

In many instances, the hub VPC gateway is deployed behind a firewall that restricts access by the spoke VPCs to the datacenter. Specifically, the firewall operates to allow or deny traffic to the hub VPC thereby acting to protect data stored and devices deployed behind the firewall to actors not known to the firewall. Firewalls typically function with rules that define guidelines for accessing data stored or devices deployed behind the firewall. For example, firewall rules may accept only certain types of network traffic, only network traffic from identified sources (e.g., according to a specified Internet Protocol (IP) address), only network traffic over particular ports, etc. In most cloud computing deployments, in order for a particular source to transmit or request network traffic to a destination behind the firewall, a firewall rule will need to be utilized defining the source-destination relationship.

Additionally, cloud providers that host hub VPCs deployed behind a firewall often have restrictions or limits on the number of firewall rules they permit. The restriction on the number of permitted firewall rules ensures scalability and resource management control for the cloud provider. In an event that a cloud provider did not provide restrictions on the number of firewall rules permitted, the cloud provider's clients would be able to utilize an unlimited amount of the cloud provider's resources; thus, creating extreme network congestion among clients as each competes for limited resources. For at least this reason, cloud providers maintain, and will continue to maintain, restrictions on the number of firewall rules on a per firewall basis.

As can be imagined, one disadvantage of restrictions on the number of firewall rules one may utilize is that the number of secure communication paths that may be established between sources outside of the firewall and destinations behind the firewall is limited. Although such restrictions aid a cloud provider, the restrictions limit the number of secure communication paths that a cloud provider client may establish between VPCs deployed outside of the firewall with a VPC deployed behind the firewall. Therefore, what is needed is a system and method for cloud provider clients to establish a plurality of cryptographically secure communication paths with a source outside of a firewall and a destination behind the firewall without utilizing a firewall rule for each secure communication path.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Figure 1:
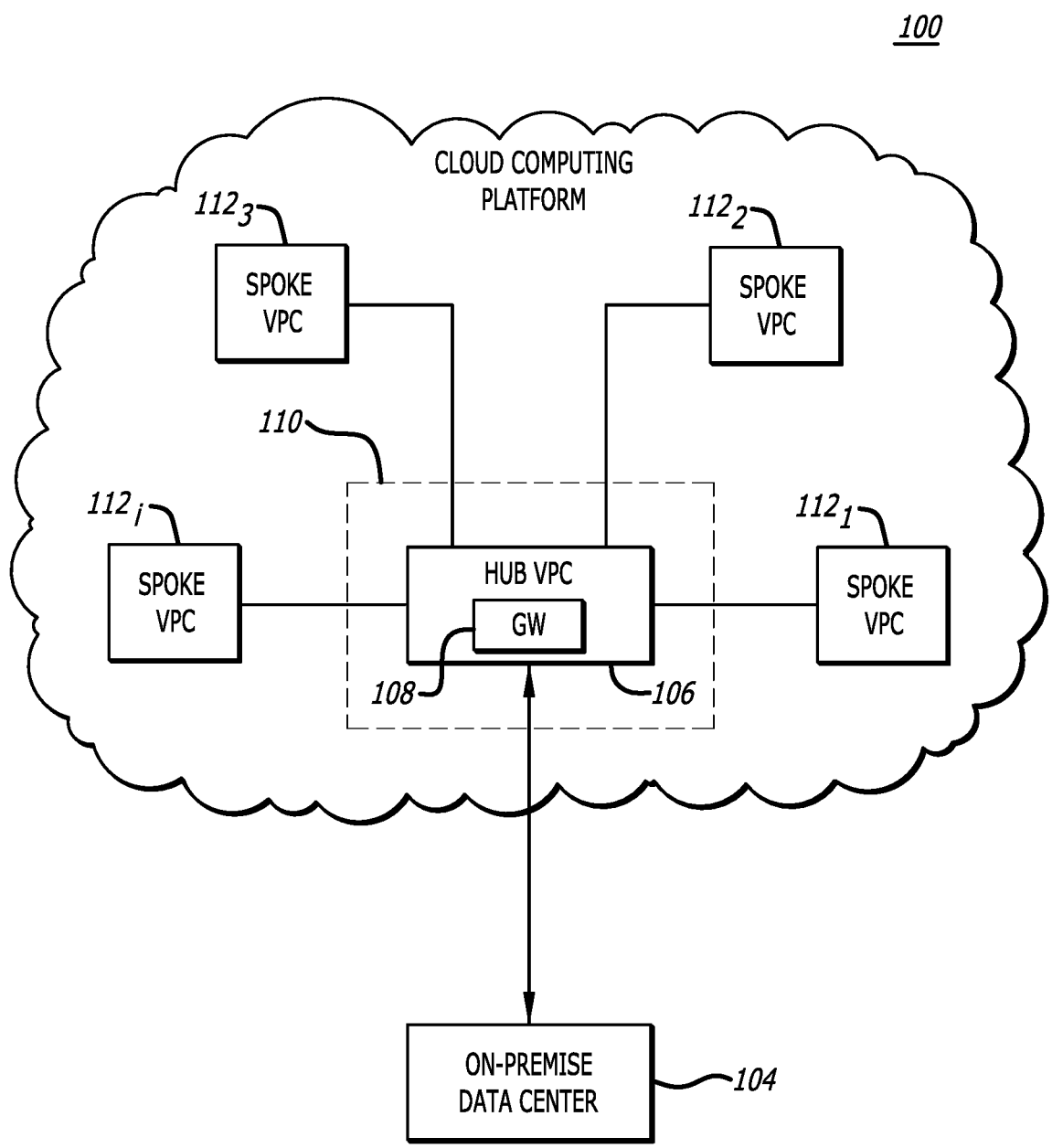
FIG. 1 is a diagram of an exemplary embodiment of a distributed cloud computing system including a hub VPC communicatively coupled with a datacenter and a plurality of spoke VPCs in accordance with some embodiments.

Embodiments of a system and a method for establishing a cryptographically secure tunnel between a virtual private cloud (VPC) gateway and a transit gateway deployed behind a firewall within a cloud computing environment are described. Herein, according to one embodiment of the disclosure, the system and method each establish one or more cryptographically secure tunnels between VPCs operating within a hub-spoke model. Specifically, a hub VPC may be communicatively coupled with a plurality of spoke VPCs. The hub VPC may serve as a centralized access point to a datacenter, for example, for each of the spoke VPCs. In some embodiments, the hub VPC includes a transit gateway and is deployed behind a firewall. In order for the spoke VPCs to communicate with the hub VPC, and thus access the datacenter through the hub VPC, the firewall needs to permit network traffic from a spoke VPC to the hub VPC. As was described above, a firewall rule may be configured to enable network traffic stemming from a specified spoke VPC (e.g., an IP address of a gateway within the spoke VPC) to pass through the firewall and be received by the transit gateway. However, due to cloud providers restricting the number of firewall rules that may be configured for a single firewall, the system and method disclosed herein enable numerous (e.g., tens, hundreds, thousands, etc.) of secure tunnels to be established between spoke VPCs and a hub VPC that is deployed behind a firewall without exceeding the number of firewalls permitted by a cloud provider.

In order to manage the establishment of secure tunnels to avoid utilizing firewall rules, a controller may be deployed within the cloud computing environment, with the controller being configured to communicate with the hub VPC and the spoke VPCs. In particular, the controller operates to manage the establishment of a secure tunnel by transmitting a message to each of a first spoke VPC and the hub VPC. The message transmitted to the hub VPC may include an instruction to transmit a message to the first spoke VPC (specifically, an IP address of a spoke gateway of the first spoke VPC). Additionally, the message transmitted to the first spoke VPC includes an instruction to transmit a message initiating a negotiation for establishment of the secure tunnel to the hub VPC (specifically, an IP address of a transit gateway of the hub VPC).

Due to the statefulness of the firewall, when a message is sent from the hub VPC to the spoke gateway, the firewall will expect a reply message and will permit a message from the spoke gateway to pass through the firewall and be received by the transit gateway. Therefore, upon receiving a message from the controller, the hub VPC transmits a message to the IP address of the spoke gateway, which serves to "open" the firewall to receive a message from the spoke gateway.

Upon receiving a message from the controller, the first spoke VPC transmits a message initiating a negotiation for establishment of a secure tunnel to the IP address of the transit gateway, which is permitted to pass through the firewall and be received by the transit gateway. As the hub VPC transmitted an initial message to the first spoke VPC opening the firewall to receive the message from the first spoke VPC that initiates the negotiation of the establishment of the secure tunnel, the resulting tunnel is established without designating a firewall rule. As will be discussed below, one example of a secure tunnel is an IPSec tunnel. However, it should be understood that the disclosure is not limited to IPSec tunnels but includes other tunneling protocols such as generic routing encapsulation (GRE) and IP-in-IP (IPIP).

I. Terminology

In the following description, certain terminology is used to describe features of the invention. In certain situations, the terms "logic" and "component" is representative of hardware, firmware, and/or software that is configured to perform one or more functions. As hardware, the logic or component may include circuitry having data processing or storage functionality. Examples of such circuitry may include, but are not limited or restricted to a microprocessor, one or more processor cores, a programmable gate array, a microcontroller, an application specific integrated circuit, wireless receiver, transmitter and/or transceiver circuitry, semiconductor memory, or combinatorial logic.

Alternatively, or in combination with the hardware circuitry described above, the logic or component may be software in the form of one or more software modules. The software module(s) may include an executable application, an application programming interface (API), a subroutine, a function, a procedure, an applet, a servlet, a routine, source code, a shared library/dynamic load library, or one or more instructions. The software module(s) may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code may be stored in persistent storage.

The term "computerized" generally represents that any corresponding operations are conducted by hardware in combination with software and/or firmware.

The term "host" may be construed as a virtual or physical logic. For instance, as an illustrative example, the host may correspond to virtual logic in the form of a software component (e.g., a virtual machine), which is assigned a hardware address (e.g., a MAC address) and an IP address within an IP address range supported by to a particular IP subnet. Alternatively, in some embodiments, the host may correspond to physical logic, such as an electronic device that is communicatively coupled to the network and assigned the hardware (MAC) address and IP address. Examples of electronic devices may include, but are not limited or restricted to a personal computer (e.g., desktop, laptop, tablet or netbook), a mobile phone, a standalone appliance, a sensor, a server, or an information routing device (e.g., a router, bridge router ("brouter"), etc.). Herein, the term "on-premises host" corresponds to a host residing as part of the "on-premises" (or local) network while a "cloud host" corresponds to a host residing as part of a public cloud network.

The term "cloud computing infrastructure" generally refers to a networked combination of hardware and software including one or more servers that each include circuitry for managing network resources, such as additional servers and computing devices. The cloud computing infrastructure also includes one or more communication interfaces as well as communication interface logic.

The term "gateway" may refer to a software instance deployed within a VPC that controls the flow of data traffic from the VPC to one or more remote sites including computing devices that may process, store and/or continue the routing of data. The terms "transit gateway" and "spoke gateway" may refer to gateways having similar architectures but are identified differently based on their location/configurations within a cloud computing platform. For instance, a "spoke" gateway is configured to interact with targeted instances while a "hub" gateway is configured to further assist in the propagation of data traffic (e.g., one or more messages) directed to a spoke gateway within a spoke VPC or a computing device within an on-premises network.

The term "controller" may refer to a software instance deployed within a cloud computing platform that manages operability of certain aspects of the cloud computing platform. For instance, a controller collects information pertaining to each VPC and configures a VPC routing table associated with each VPC to establish communication links (e.g., logical connections) between a certain spoke gateway and cloud instances associated with a particular instance subnet. A VPC routing table is programmed to support communication links between different sources and destinations, such as an on-premise computing devices, a cloud instance within a particular instance subnet or the like. In addition, the controller establishes each gateway instance and manages operability of the gateways by, for example, configuring gateway routing tables each of the gateways within each VPC. Further, the controller may manage the establishment of secure communication links (e.g., IPSec tunnels) between each spoke VPC and a hub VPC deployed within a cloud computing platform.

The term "message" generally refers to information in a prescribed format and transmitted in accordance with a suitable delivery protocol. Hence, each message may be in the form of one or more packets, frames, or any other series of bits having the prescribed format.

The term "transmission medium" may be construed as a physical or logical communication path between two or more electronic devices. For instance, as a physical communication path, wired and/or wireless interconnects in the form of electrical wiring, optical fiber, cable, bus trace, or a wireless channel using infrared, radio frequency (RF), may be used.

Finally, the terms "or" and "and/or" as used herein are to be interpreted as inclusive or meaning any one or any combination. As an example, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

II. General Architecture

Referring to FIG. 1, a diagram of an exemplary embodiment of a distributed cloud computing system including a hub VPC communicatively coupled with a datacenter and a plurality of spoke VPCs is shown in accordance with some embodiments. The cloud computing network environment 100 includes a cloud computing platform 102 hosting a plurality of VPCs including a hub VPC 106 having a transit gateway (TGW) 108 and a plurality of spoke VPCs $112_1$-$112_i$. In the embodiment illustrated, the hub VPC 106 is deployed behind a firewall 110.

The hub VPC 106 may be communicatively coupled to one or more individual networking devices, one or more datacenters, and/or one or more networks (e.g., an enterprise network). For simplicity, FIG. 1 illustrates a communicative coupling between the hub VPC 106 and an on-premise datacenter 104; however, the disclosure is not intended to be so limited. In one embodiment, the communicative coupling may take various forms that often include Communication over Internet Protocol (CoIP), which broadly refers to the exchange or transmission of data over the internet, such as via the Internet Protocol. In one embodiment, the hub VPC 106 may be communicatively coupled to the datacenter 104 via an Internet Protocol Security (IPSec) tunnel. IPSec refers to a secure network protocol suite for authenticating and encrypting network packets to ensure secure, encrypted communications between two computing devices over an IP network. Similarly, each of the spoke VPCs $112_1$-$112_i$ may be communicatively coupled to the hub VPC 106 via an IPSec tunnel.

Figure 2:
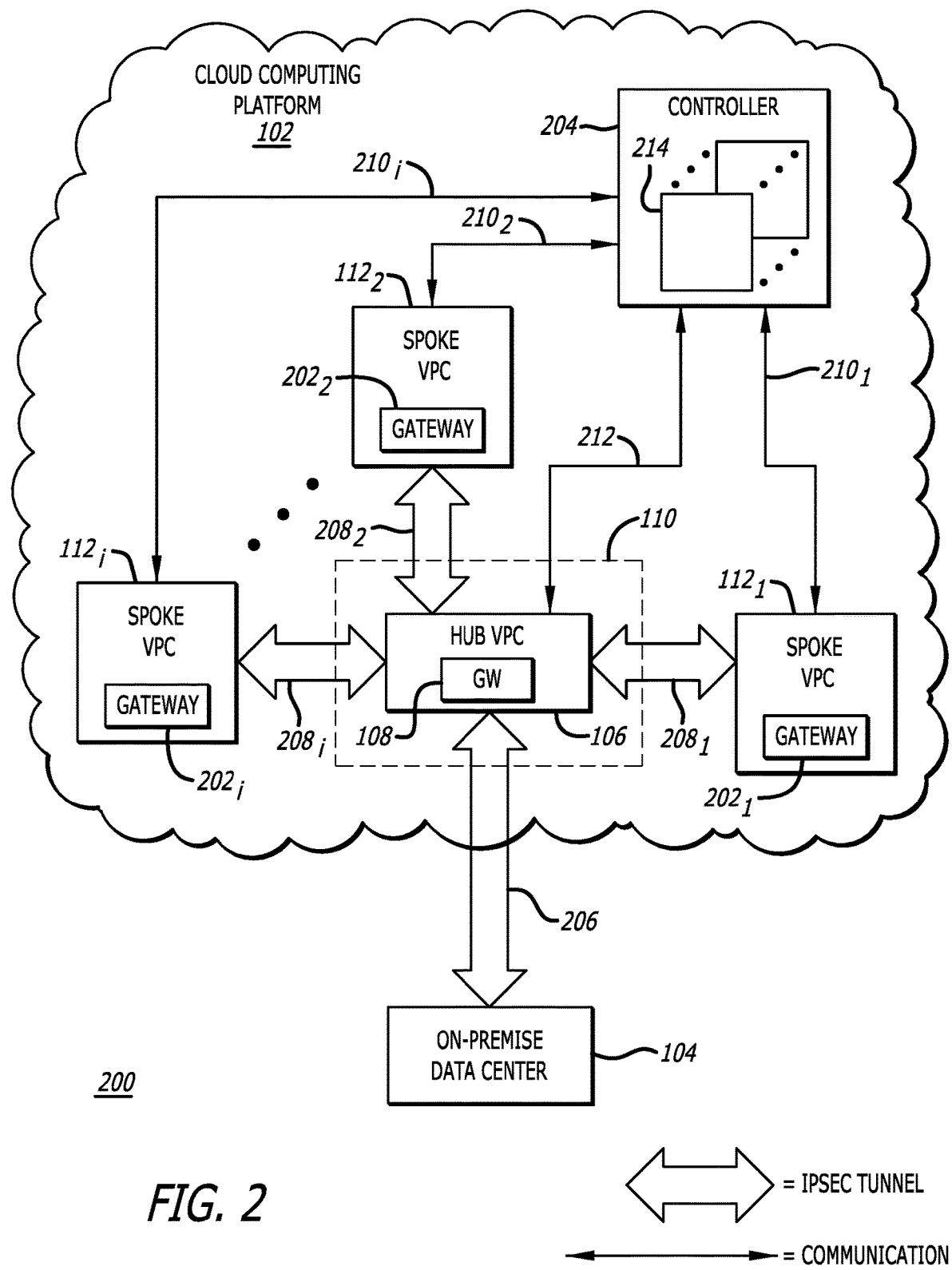
FIG. 2 is a detailed diagram of the exemplary embodiment of FIG. 1 further illustrating a controller communicatively coupled to the hub VPC and the spoke VPCs in accordance with some embodiments.

However, as the hub VPC 106 is deployed behind the firewall 110, during an establishment of a communicative coupling involving the hub VPC 106, the firewall 110 is to be considered. In one embodiment, the firewall 110 may be configured with a firewall rule designated for each communicative coupling. In some embodiments, a firewall rule designates whether the firewall 110 will allow or deny network traffic from a source outside of the firewall (e.g., a gateway of the VPC $112_1$ as seen in FIG. 2) to a destination behind the firewall (e.g., the gateway 108 of the hub VPC 106). As discussed above, the requirement to designate a firewall rule for each spoke VPC $112_1$-$112_i$ has several disadvantages.

Therefore, in one embodiment and as will be discussed in more detail below, the statefulness of the firewall 110 may be exploited such that an initial network transmission may be sent from the hub VPC 106 to a spoke VPC (e.g., the spoke VPC $112_1$) and the firewall 110 will expect a reply from the spoke VPC $112_1$. The spoke VPC $112_1$ may reply with a network transmission that includes authenticating credentials in order to begin an IPSec negotiation. As the firewall is expecting the reply transmission from the spoke VPC $112_1$, the firewall 110 will allow the reply transmission to pass through and be received by the hub VPC 106. The hub VPC 106 then continues exchanging transmissions necessary to complete the IPSec negotiation and establish an IPSec tunnel between the hub VPC 106 and the spoke VPC $112_1$. As is known in the art, an established IPSec tunnel includes a "keep alive" functionality so that, once established, the IPSec tunnel remains alive until termination (e.g., termination of the spoke VPC $112_1$). Thus, an IPSec tunnel is established between the hub VPC 106 and the spoke VPC $112_1$ without requiring designation of a firewall rule.

As a result, establishing an IPSec tunnel between the hub VPC 106 and a spoke VPC using the operations described above enables a plurality of IPSec tunnels to be established between the hub VPC 106 and spoke VPCs (e.g., spoke VPCs $112_1$-$112_i$) without requiring designation of a firewall rule for each IPSec tunnel. Therefore, tens, hundreds, thousands, etc., of IPSec tunnels may be established and kept alive concurrently (e.g., at least partially overlapping in time) regardless of restrictions imposed by a cloud provider in the number of firewall rules permitted.

It should be understood that the hub VPC 106 and one or more of the spoke VPCs 112₁-112ᵢ may be created by a controller deployed within the cloud computing platform (or "cloud computing environment") or may be created by other devices or virtual instances. For example, a cloud computing management device (such as the AWS® Management Console) may create the hub VPC 106 or one or more of the spoke VPCs 112₁-112ᵢ.

Referring now to FIG. 2, a detailed diagram of the exemplary embodiment of FIG. 1 further illustrating a controller communicatively coupled to the hub VPC and the spoke VPCs is shown in accordance with some embodiments. The cloud computing network environment 200 includes the cloud computing platform 102 hosting a plurality of VPCs including the hub VPC 106 having a transit gateway (TGW) 108 and deployed behind the firewall 110, and the plurality of spoke VPCs 112₁-112ᵢ. As is illustrated in FIG. 1 for purposes of simplicity, the datacenter 104 is shown in FIG. 2 to be communicatively coupled to the hub VPC 106. Specifically, FIG. 2 illustrates that the communicative coupling may be via an IPSec tunnel 206. In one embodiment, the IPSec tunnel 206 may be established as a result of the controller 204 transmitting a message (not shown) to the hub VPC 106 to initiate an IPSec negotiation and completion thereof.

Additionally, the cloud computing network environment 200 includes a controller 204 that is configured to communicate with the hub VPC 106 and the plurality of spoke VPCs 112₁-112ᵢ. The general configuration of the cloud computing network environment 200 will now be discussed with respect to FIG. 2 while the operations performed by each component will be discussed more specifically with respect to FIGS. 3-4.

In the configuration of the cloud computing network environment 200, the controller 204 creates each spoke VPC of the spoke VPCs 112₁-112ᵢ, wherein each spoke VPC includes a spoke gateway 202₁-202ⱼ. During creation of the spoke VPC, e.g., spoke VPC 112₁, a range of IP addresses, is specified for and assigned to the spoke VPC 112₁. As one example, the range of IP addresses may be a range of IPV4 addresses in the form of a Classless Inter-Domain Routing (CIDR) block, for example, 10.0.0.0/16. Further, the corresponding gateway, e.g., 202₁, is assigned a specific IP address within the specified IP address range. The controller 204 maintains a recording of the IP address ranges assigned to each spoke VPC and the IP address assigned to each spoke gateway. The recording may be stored, for example, in the configuration files 214, a database and/or other datastore (not shown). It should be understood that other versions of the Internet Protocol may be utilized and that the disclosure is not limited to IPV4.

Logic of the controller 204 performs operations to cause the creation of the hub VPC 106 deployed behind the firewall 110 as well as each of the spoke VPCs 112₁-112ᵢ deployed outside of the firewall 110. For example in one embodiment, the controller 204 receives user input indicating that a hub VPC is to be created. In response, the controller 204 deploys a hub VPC. As an alternative method, user input may be received by a platform (or "console") of a cloud provider, which may be via an internet browser or software application processing on a network device (e.g., a mobile application processing on a mobile device). One example of a platform of a cloud provider is the AWS® Management Console.

Additionally, the controller 204 may perform operations of deploying a gateway within the hub VPC and creating a firewall around the hub VPC (and any other virtual machine or virtual instance deployed in cloud computing resources to reduce the potential attack surface of the software environment). The firewall rules may also be configured by the controller 204. For example, the firewall rules may ensure that only a single controller (i.e., the controller 204) is able to access the gateway over HTTPS (e.g., TCP port 443).

As is illustrated, operations of the controller 204 cause transmission of messages to the spoke VPCs 112₁-112ᵢ and the hub VPC 106. Specifically, the controller 204 may instruct a spoke VPC 112₁ and the hub 106 to establish a communicative coupling such as an IPSec tunnel without utilizing a firewall rule. As an example of the instructions provided by the controller 204 to establish an IPSec tunnel without utilizing a firewall rule, the following will discuss such an establishment between the spoke VPC 112₁ and the hub VPC 106.

Such instruction may take the form of a message 212 transmitted from the controller 204 to the hub VPC 106 to be received by the transit gateway 108. The message 212 may take various forms while including data comprising an instruction to transmit a message to the IP address of the spoke gateway 202₁. The message 212 may include additional data, such as a specific time to send a message to the IP address of the spoke gateway 202₁, for example. As discussed above, due to the statefulness of the firewall 110, when an initial message is sent from the hub VPC 106 to the spoke gateway 202₁, the firewall 110 expects a message (from the destination IP address) and will permit such a message to pass through the firewall 110 and be received by the transit gateway 108. Upon receiving the message 212, the hub VPC 106 transmits a message to the IP address of the spoke gateway 202₁. The message transmitted to the IP address of the spoke gateway 202₁ need not include any particular data, and in fact may be rejected by the spoke gateway 202₁. The importance of the message transmitted to the spoke gateway 202₁ is in "opening" the firewall 110 such that the firewall 110 expects a reply message from a source having an IP address to which the message was sent.

In addition to the message 212 transmitted to the hub VPC 106, the controller 204 may also cause transmission of a message 210₁ to the spoke VPC 112₁ to be received by the spoke gateway 202₂. The message 210₁ may take various forms while including data comprising an instruction to transmit a message initiating an IPSec negotiation to the IP address of the transit gateway 108. The message 210₁ may include additional data, such as, for example, a specific time to send a message to the IP address of the transit gateway 108, a number of retransmission attempts prior to reporting a failure to establish an IPSec tunnel, a time period to wait until retransmitting the message to the IP address of the transit gateway 108, etc. Upon receiving the message 210₁, the spoke VPC 112₁ transmits a message initiating an IPSec negotiation to the IP address of the transit gateway 108, which may include authenticating credentials of the spoke VPC 112₁. As the firewall 100 is expecting a message from the IP address of the spoke VPC 112₁, the firewall 110 permits the message to pass through and be received by the transit gateway 108.

The initiation of an IPSec negotiation results in the establishment of the IPSec tunnel 208₁. As the communicative coupling was initiated by the initial message from the hub VPC 106 to the spoke gateway 202₁, a firewall rule was not needed or utilized. The IPSec tunnels 208₂-208ⱼ may each be established in a similar as the establishment of IPSec tunnel 208₁.

In the situation in which the spoke gateway 202₁ does not receive a response to the message initiating an IPSec negotiation from the transit gateway 108 within a predetermined time period, the spoke gateway 202₁ retransmits the message. The message may be retransmitted a plurality of times prior to the spoke gateway 202₁ transmitting a message to the controller 204 indicating a failure to establish the IPSec tunnel. For example, the message initiating the IPSec negotiation transmitted by spoke gateway 202₁ may be received at the firewall 110 prior to the transmission of the message to the IP address of the spoke gateway 202 by the transit gateway 202₁. In such a case, the firewall 110 will reject the message from the spoke gateway 202₁ as the firewall is not expecting a message from the source IP address (i.e., of the spoke gateway 202₁).

III. Operational Flow

Figure 3:
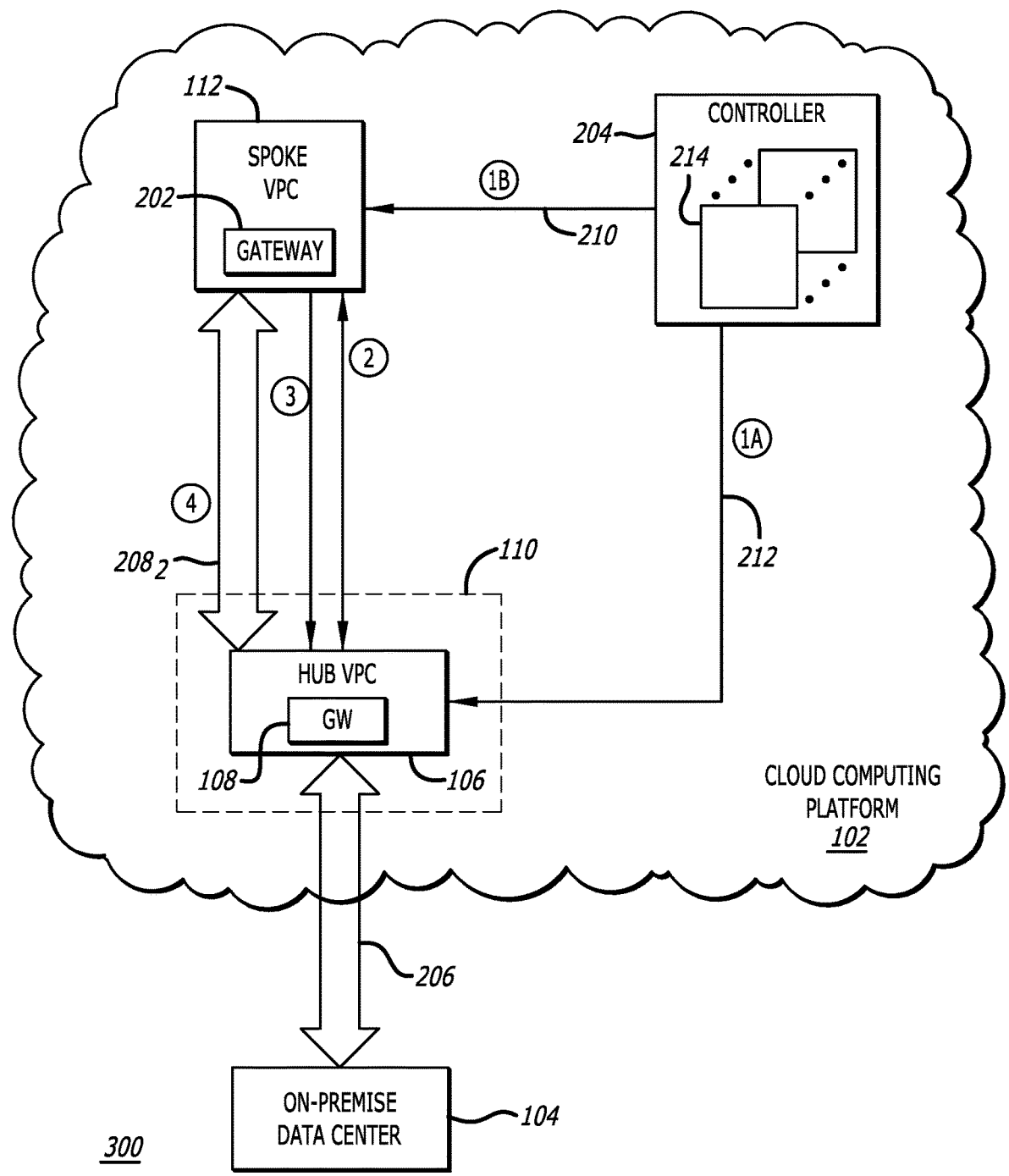
FIG. 3 is a diagram generalizing the exemplary embodiment of FIG. 1 to illustrate a set of operations performed in establishing a cryptographically secured IPSec tunnel between the hub VPC and the and the spoke VPC without utilizing a firewall rule in accordance with some embodiments.

Referring to FIG. 3, a diagram generalizing the exemplary embodiment of FIG. 1 to illustrate a set of operations performed in establishing a cryptographically secured IPSec tunnel between the hub VPC and the spoke VPC without utilizing a firewall rule is shown in accordance with some embodiments. The cloud computing network environment 300 includes the cloud computing platform 102 hosting a plurality of VPCs including the hub VPC 106 including a transit gateway (TGW) 108 and deployed behind the firewall 110, and a plurality of spoke VPCs. For purposes of clarity, FIG. 3 generalizes the spoke VPCs 112₁-112ᵢ discussed above as "spoke VPC 112." As should be understood, the discussion below of the "spoke VPC 112" pertains to any of the spoke VPCs 112₁-112ᵢ. Similar to FIG. 2, for purposes of simplicity, the datacenter 104 is shown in FIG. 3 to be communicatively coupled to the hub VPC 106, however, other network devices and/or networks may be communicatively coupled thereto. Additionally, the cloud computing network environment 300 includes the controller 204 as discussed above with respect to FIG. 2.

FIG. 3 provides an illustration of a plurality of operations performed with the cloud computing network environment 300 and includes a plurality of numerals, i.e., 1A-4, with each numeral representing one or more operations. The numerals 1A-4 may reference the chronological ordering of the operation(s) performed in some embodiments; however, in other embodiments, one or more of these operation(s) may be conducted in a different ordering than illustrated.

With reference to the illustration, the controller 204 transmits the message 212 to the hub VPC 106 (numeral 1A) and the message 210 to the spoke VPC 112 (numeral 1B). As discussed above, the message 212 is transmitted to the IP address of the transit gateway 108, which is recorded in the configuration files 214 and maintained by the controller 204. The message 212 includes, inter alia, an instruction to transmit a communication to the IP address of the spoke VPC 112 and provides the corresponding IP address. Further, the message 210 is transmitted to the IP address of the spoke gateway 202, which is similarly recorded in the configuration files 214 and maintained by the controller 204. The message 210 includes, inter alia, an instruction to initiate an IPSec negotiation with the transit gateway 108 and provides the IP address of the transit gateway 108.

In response to receiving the message 212, the hub VPC 106 transmits a message to the IP address of the spoke gateway 202 (numeral 2). As discussed above, the transmission of the message to a particular IP address exploits the statefulness of the firewall 110 by "opening" the firewall 110 to receive a message from the destination IP address, namely the IP address of the spoke gateway 202.

In response to receiving the message 210, the spoke VPC 112 transmits a message to the IP address of the transit gateway 108 (numeral 3). Specifically, the message is an initiation of an IPSec negotiation. As discussed above, as the firewall 110 is expecting a message from the IP address of the spoke gateway 202, the message is permitted to pass through the firewall 110 and is received by the transit gateway 108. As is known in the art, the transit gateway 108 and the spoke gateway 202 may exchange a series of messages regarding encryption, authentication and additional parameters (e.g., permitted network traffic) before an IPSec tunnel is established. Following completion of the IPSec negotiation, an IPSec tunnel is established between the spoke gateway 202 and the transit gateway 108 (numeral 4).

Figure 4:
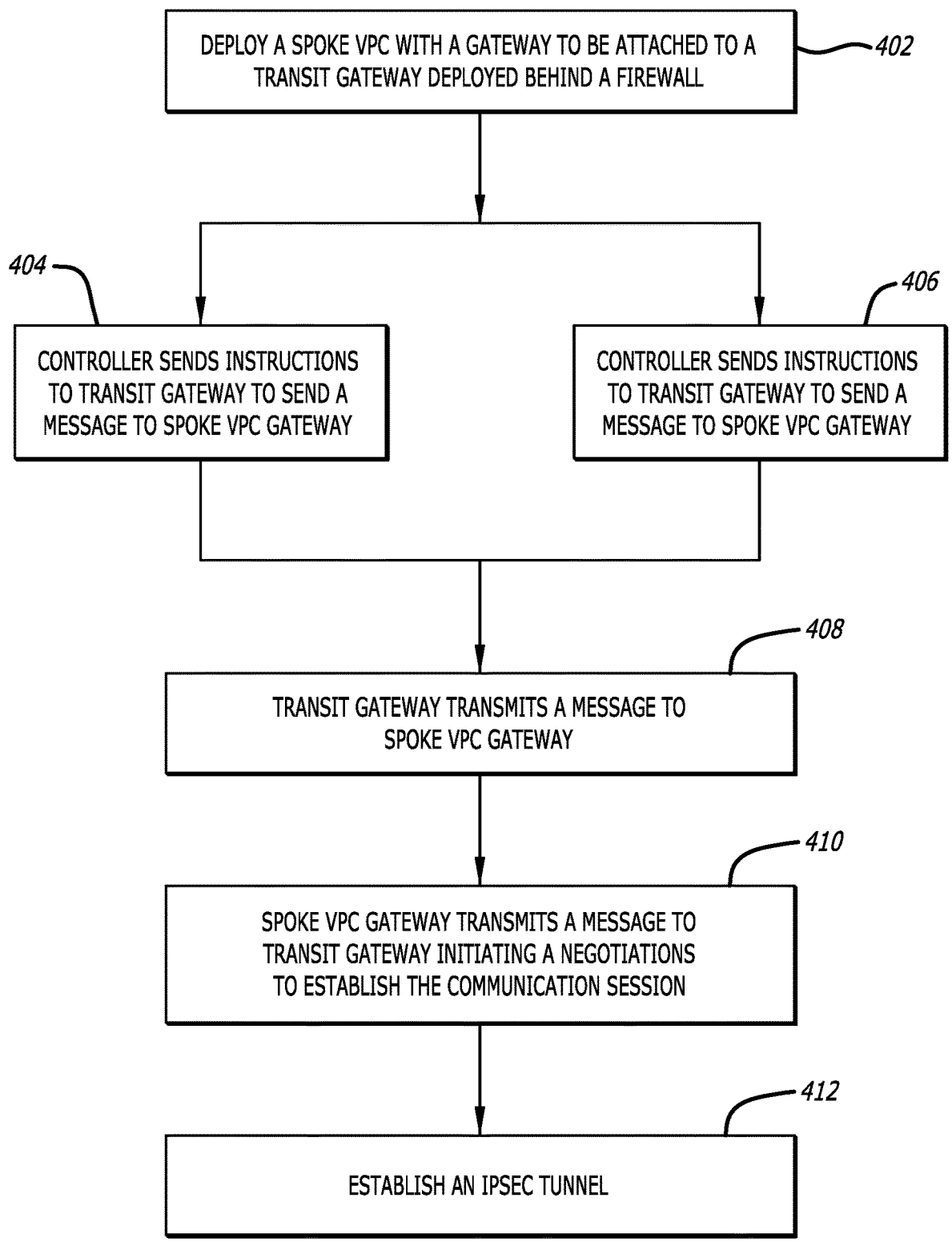
FIG. 4 is a second exemplary flowchart illustrating the operations involved in in establishing a cryptographically secured IPSec tunnel between the hub VPC and the spoke VPC as illustrated in FIG. 3 in accordance with some embodiments.

Referring to FIG. 4, a second exemplary flowchart illustrating the operations involved in in establishing a cryptographically secured IPSec tunnel between the hub VPC and the spoke VPC as illustrated in FIG. 3 is shown in accordance with some embodiments. Each block illustrated in FIG. 4 represents an operation performed in the method 400 communicatively coupling a spoke VPC to a hub VPC that deployed behind a firewall without utilizing a firewall rule. It is assumed that prior to the beginning of the method 400, a controller has been deployed within a cloud computing network environment (which may be a public cloud network). Additionally, it is assumed that a hub VPC and at least a first spoke VPC have each been created, with the hub VPC being deployed behind a firewall. Further, the hub VPC is assumed to be created with a hub (transit) gateway while the spoke VPC is assumed to be created with a spoke gateway.

The method 400 begins when the spoke VPC is deployed and is to be attached (e.g., communicatively coupled) to the transit gateway that is deployed behind a firewall (block 402). The method 400 includes two operations (blocks 404-406) that may be performed in any order as well as in parallel or concurrently. One operation includes the controller sending a message to the transit gateway including an instruction to transmit a message to the spoke gateway (block 404). Another operation includes the controller sending a message to the spoke gateway including an instruction to initiate an IPSec negotiation with the transit gateway (block 406).

Subsequent to blocks 404-406, the method 400 continues with the transit gateway transmitting a message to the spoke gateway (block 408). As discussed above, the message transmitted by the transit gateway is addressed to the IP address of the spoke gateway, which, given the statefulness of the firewall, opens the firewall for receipt of a message transmitted from the IP address of the spoke gateway.

Subsequent to the spoke VPC receiving the message from the controller, the spoke gateway transmits a message to the transit gateway initiating an IPSec negotiation (block 410). As the firewall deployed around the transit gateway is expecting a message from the IP address of the spoke gateway, the spoke gateway's message is permitted to pass through the firewall and be received by the transit gateway. Finally, the IPSec negotiation is completed through a series of messages exchanged between the spoke gateway and the transit gateway and an IPSec tunnel is established therebetween (block 412). As the transit gateway initiated a communication with the spoke gateway, the spoke gateway's message was permitted to pass through the firewall. As a result, the IPSec negotiation and eventual establishment of an IPSec tunnel may be performed through operations comprising the method 400 without utilizing a firewall rule.

IV. Additional Embodiment

Figure 5:
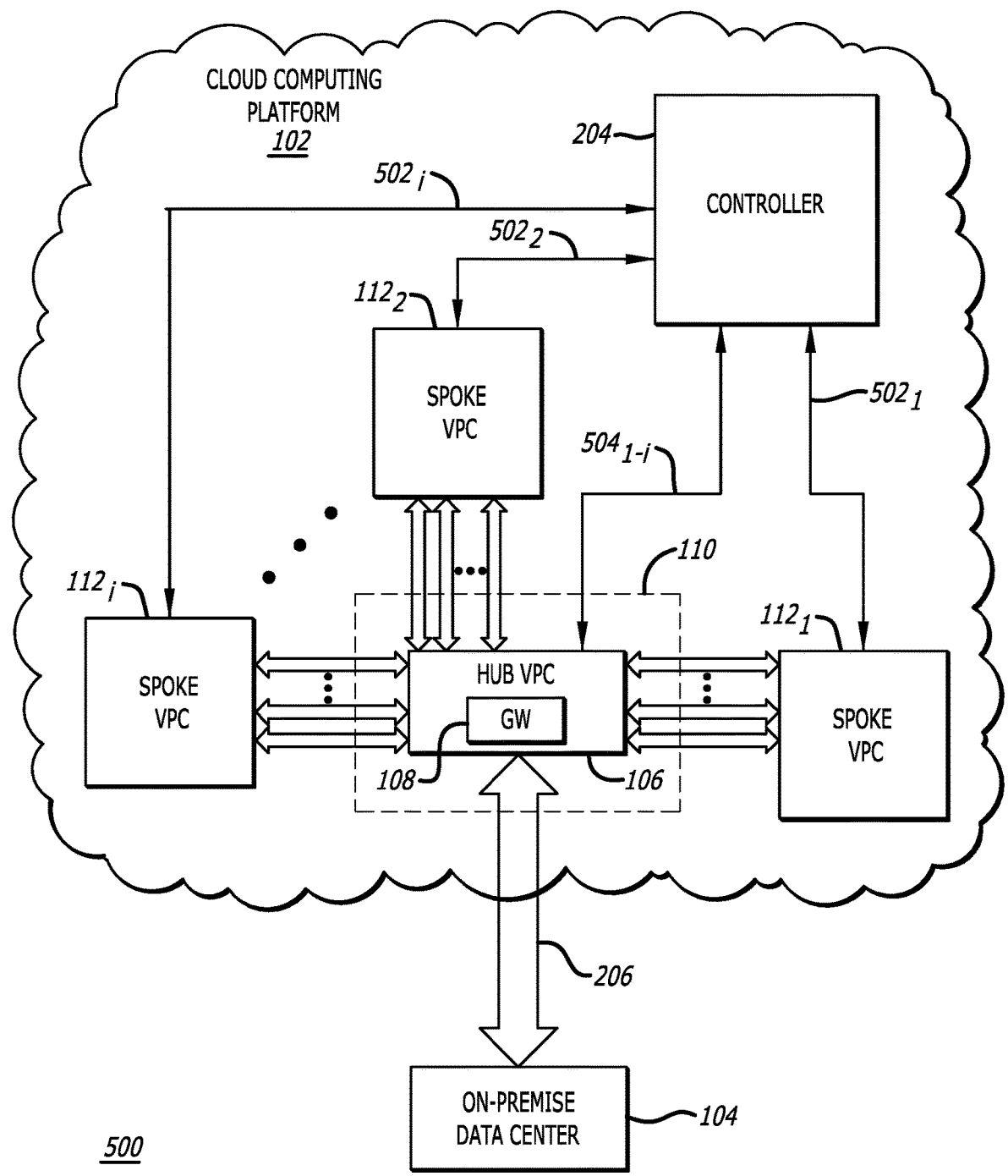
FIG. 5 is a diagram of an exemplary embodiment of a distributed cloud computing system including a hub VPC communicatively coupled a plurality of spoke VPCs with each coupling comprising a plurality of IPSec tunnels in accordance with some embodiments.

Referring now to FIG. 5, a diagram of an exemplary embodiment of a distributed cloud computing system including a hub VPC communicatively coupled a plurality of spoke VPCs with each coupling comprising a plurality of IPSec tunnels is shown in accordance with some embodiments. The cloud computing network environment 500 includes the components illustrated in FIG. 2 including the cloud computing platform 102 hosting a plurality of VPCs including the hub VPC 106 deployed behind the firewall 110, and the plurality of spoke VPCs 112$_1$-112$_i$. As discussed above, for purposes of simplicity, the hub VPC 106 is shown to be communicatively coupled to the datacenter 104 via the IPSec tunnel 206.

Additionally, the cloud computing network environment 500 includes the controller 204 that is configured to communicate with the hub VPC 106 and the plurality of spoke VPCs 112$_1$-112$i$. As discussed above, such communications include instructions to establish one or more IPSec tunnels between the hub VPC 106 and one of the spoke VPCs 112$_1$-112$_i$. Specifically illustrated in FIG. 5 is the embodiment in which a plurality of IPSec tunnels are established between a single spoke VPC 112$_1$-112$_i$ and the hub VPC 106. In some instances, tens, hundreds or even thousands of IPSec tunnels may be established between a single spoke VPC 112$_1$-112$_i$ and the hub VPC 106, which greatly improves throughput between the spoke VPC and the hub VPC 106. Establishment of a plurality of IPSec tunnels between a single spoke VPC 112$_1$-112$_i$ and the hub VPC 106 greatly improves throughout therebetween of network traffic. Specifically, a single IPSec tunnel may have limits on the amount of network traffic that may be transmitted at a single time; thus, having a plurality of IPSec tunnels between a single spoke VPC 112$_1$-112$_i$ leads to improved throughput.

In a similar manner as was described with respect to at least FIG. 2, operations of the controller 204 cause the transmission of messages to the spoke VPCs 112$_1$-112$_i$ and the hub VPC 106. Although FIG. 2 illustrates a single IPSec tunnel established between a spoke VPC and the hub VPC 106, in the embodiment of FIG. 5, the controller 204 instructs a spoke VPC, e.g., the spoke VPC 112$_1$, and the hub 106 to establish a plurality of IPSec tunnels therebetween without utilizing a firewall rule.

Similar to the process for a establishing a single IPSec tunnel discussed above, the controller may transmit a message 502$_1$ to the spoke VPC 112$_1$ and a message 504$_1$ to the hub VPC 106. With respect to FIG. 5, in one embodiment, the message 502$_1$ may include an instruction to establish a plurality of IPSec tunnels by transmitting a plurality of messages that each initiate an IPSec negotiation. Similarly, the message 504$_1$ transmitted to the hub VPC 106 may include an instruction to transmit a plurality of messages to the IP address of the spoke gateway 202$_1$. In other embodiments, a plurality of messages may be sent to each of the spoke VPC 112$_1$ and the hub 106 with each message including an instruction corresponding to establishment of an IPSec tunnel.

In some embodiments in which the message 502$_1$ includes an instruction to transmit a plurality of messages each initiating an IPSec negotiation. The message 502$_1$ may include instructions regarding parameters of timing of transmission of each message initiating an IPSec negotiation (e.g., one message every 2 seconds), a number of messages to be transmitted, a number of retransmissions for each message, etc. Similarly, the message 504$_1$ may include an instruction to transmit a plurality of messages to the spoke gateway 202$_1$. The message 504$_1$ may include instructions regarding parameters of timing of transmission of each message (e.g., one message every 2 seconds), a number of messages to be transmitted, etc.

As discussed above, due to the statefulness of the firewall 110, each message transmitted by the transit gateway 108 to the IP address of the spoke gateway 202$_1$ opens the firewall 110 up to receive a message from the IP address of the spoke gateway 202$_1$. Thus, by transmitting tens, hundreds or thousands of messages from the transit gateway 108 to the IP address of the spoke gateway 202$_1$, the firewall 110 will permit the same number of messages from the IP address of the spoke gateway 202$_1$ to pass through the firewall 110 and be received by the transit gateway 108, which enables the same number of IPSec negotiations to take place. Therefore, following the completion of tens, hundreds or thousands of IPSec negotiations, a corresponding number of IPSec tunnels will be established between the hub 106 and the spoke VPC 112$_1$ without utilizing a firewall rule to do so.

IV. Logical Representation

Figure 6:
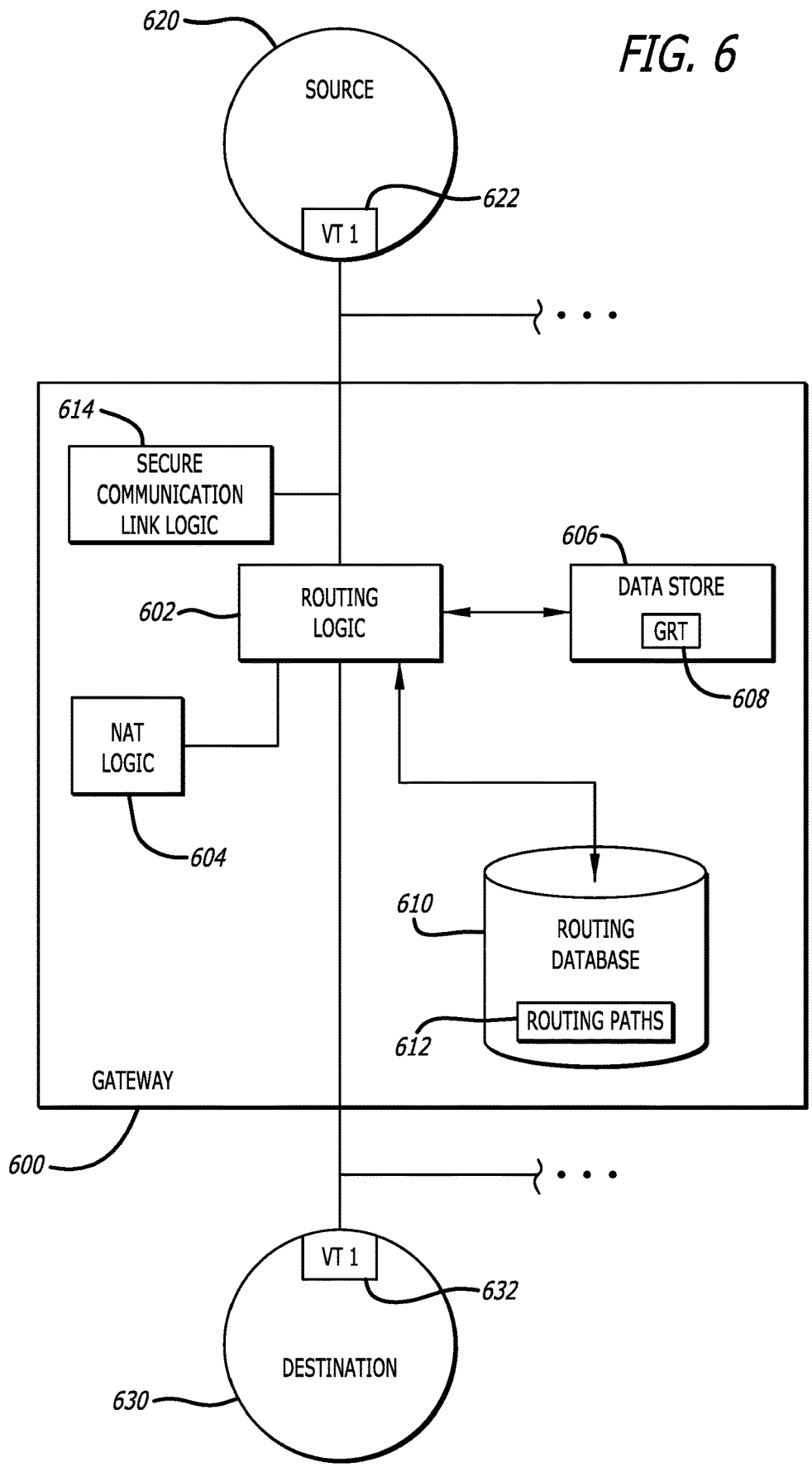
FIG. 6 is an exemplary illustration of a logical representation of a gateway deployed within a virtual private cloud in accordance with some embodiments.

Referring now to FIG. 6, an exemplary illustration of a logical representation of a gateway (e.g., the gateway 108 or the gateway 202$_1$) deployed within a virtual private cloud (e.g., the VPC 106 or the VPC 112$_1$) is shown in accordance with some embodiments.

In one example, the gateway 600 may correspond to logic that provides a logical connection between a source 620 and a destination 630. The source 620 may correspond to a user (e.g., an on-premise computing device), a resource within a VPC (e.g., cloud instance), or another gateway that supports connectivity with the destination 630, as referenced by a virtual tunnel interface (VTI) 632. Herein, in this example, the destination 630 may correspond to a cloud instance (when the source 620 is a user or gateway), a user (when the source 620 is a cloud interface or a gateway), or a gateway (when the source 620 is a user, cloud interface or another gateway), as referenced by a VTI 622. As represented, the gateway 600 may support logical connections with one or more sources 620 and/or one or more destinations 630.

The gateway 600 may be configured with routing logic 602, a data store 606 and a secure communication link logic 614. As shown in FIG. 6, the data store 606 may include a gateway routing table 608. The gateway routing table 608 is referenced by the routing logic 602 in determining which communication link is used for transmission of the data received from the source 620 for routing towards the destination 630. Additionally, the route database 610 may include routing paths 612 such that the routing database 610 may be configured to retain the routing paths 612 for retrieval when a disabled routing path is removed from the gateway routing table 608.

As an optional component, the gateway 600 may include network address translation (NAT) logic 604 that, when executed, is configured to perform translation of the IP addresses for data packets transmitted between a first VPC (e.g., the spoke VPC 112$_1$) and a second VPC (e.g., the hub VPC 106).

The secure communication link logic 614 may, upon execution by one or more processors, perform operations that cause transmission of messages to each of a spoke gateway (e.g., the spoke gateway 202$_1$) and a transit gateway (e.g., the transit gateway 108) that provide instructions to each gateway for the establishment of a secure communication link therebetween. In particular, a message transmitted to the transit gateway includes data comprising an instruction to transmit a message to the IP address of the spoke gateway 202$_1$. The message 212 may include additional data, such as a specific time to send a message to the IP address of the spoke gateway 202$_1$, for example. Additionally, a message transmitted to the spoke gateway includes an instruction to transmit a message initiating an IPSec negotiation to the IP address of the transit gateway. The message may include additional data, such as, for example, a specific time to send a message to the IP address of the transit gateway, a number of retransmission attempts prior to reporting a failure to establish an IPSec tunnel, a time period to wait until retransmitting the message to the IP address of the transit gateway, etc.

Figure 7:
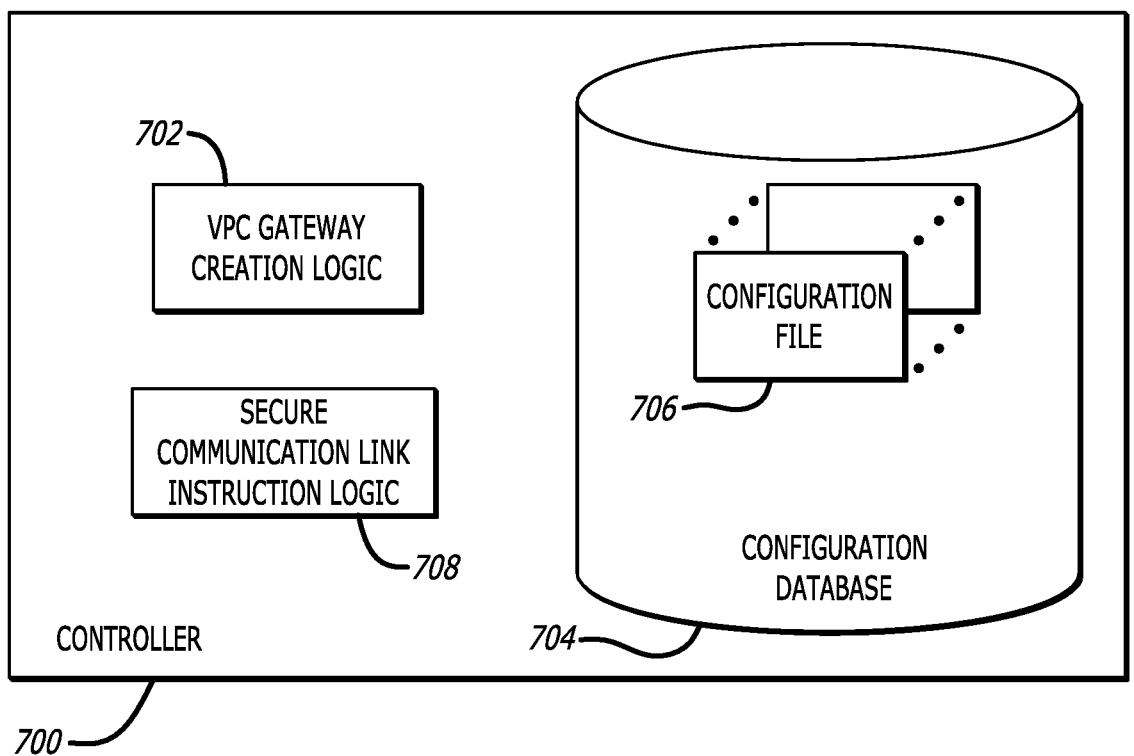
FIG. 7 is an exemplary illustration of a logical representation of a controller deployed within a cloud computing platform in accordance with some embodiments.

Referring now to FIG. 7, an exemplary illustration of a logical representation of a controller (e.g., the controller 204) deployed within a cloud computing platform (e.g., the cloud computing platform 102) is shown in accordance with some embodiments. In one example, the gateway 700 may correspond to logic that is configured to create a set of VPC instances (e.g., the spoke VPC $112_1$ and the hub VPC 106) and provide instructions to each VPC instance pertaining to, at least, the establishment of secure communication links therebetween. As shown, the controller 700 may include a VPC creation logic 702, a configuration database 704 that stores configuration files 706 (such as the configuration files 214), and a secure communication link instruction logic 708.

The VPC gateway creation logic 702 performs operations to create a gateway within a VPC including creating a virtual machine within a VPC (i.e., hub or spoke), provide configuration data to the virtual machine, and prompt initialization of the gateway based on the configuration data. In one embodiment in which the cloud computing resources utilized are AWS®, the VPC gateway creation logic 702 launches a virtual machine within a VPC (hub or spoke), the virtual machine being an AMAZON® EC2 instance. The virtual machine is launched using a pre-configured virtual machine image published by the controller 700. In the particular embodiment, the virtual machine image is an Amazon Machine Image (AMI). When launched, the virtual machine is capable of receiving and interpreting instructions from the controller 700.

Following the launch of the virtual machine, the controller 700 transmits configuration data to the gateway. Subsequently, the controller 700 issues a command received by the virtual machine causing the virtual machine to begin an initialization process of a gateway based on the configuration data. Initialization of the gateway enables the gateway to receive messages from the controller 700.

The secure communication link instruction logic 708 is configured to, upon execution by one or more processors, generate and cause transmission of messages to a hub VPC and spoke VPCs. In particular, following the creation of a hub VPC and one or more spoke VPCs, the secure communication link instruction logic 708 may generate messages and cause transmission thereof to each of the hub VPC and a first spoke VPC. As discussed above, the message transmitted to the hub VPC may be addressed to be received be the transit gateway of the hub VPC and include at least the IP address of the spoke gateway of the first spoke VPC. The message includes an instruction to the hub VPC to transmit a message to the IP address of the spoke gateway. As also discussed above, the message transmitted to the first spoke VPC may be addressed to be received be the spoke gateway and include at least the IP address of the transit gateway of the hub VPC. The message includes an instruction to the first spoke VPC to transmit a message to the IP address of the transit gateway that initiates an IPSec negotiation. Further, the message to the first spoke VPC includes instruction to re-transmit the message to the transit gateway when a response has not been received within a specified time period. The secure communication link instruction logic 708 may further be configured to maintain a record of the established IPSec tunnels between a hub VPC and each spoke VPC deployed within a cloud computing platform.

Additionally, the secure communication link instruction logic 708 accesses the configuration database 704 (and specifically, the configuration files 214) in order to determine information corresponding to the transit gateway and each spoke gateway in order to populate such information in the messages generated by the secure communication link instruction logic 708 discussed above.

In the foregoing description, the invention is described with reference to specific exemplary embodiments thereof. However, it will be evident that various modifications and changes may be made thereto without departing from the broader spirit and scope of the invention as set forth in the appended claims.

What is claimed is:

1. A network system comprising:
a controller configured to deploy virtual private cloud networks and gateways within a cloud computing environment and communicate with each of the virtual private cloud networks and gateways;
a first virtual private cloud network including a first gateway, wherein a firewall is deployed around the first virtual private cloud network; and
a second virtual private cloud network including a second gateway,
wherein the controller is configured to send:
a first message to the first gateway instructing the first gateway to transmit a second message to the second gateway;
a third message to the second gateway, the third message comprising an instruction to transmit a fourth message initiating an Internet Protocol Security (IPSec) negotiation to an IP address of the first gateway,
wherein transmission of the second message to the second gateway opens the firewall for receipt of the fourth message from the second gateway.

2. The network system of claim 1, wherein the first security protocol is IPSec.

3. The network system of claim 1, wherein the firewall is configured to prevent network communications from a source outside the first virtual private cloud network from being received by a destination within the first virtual private cloud network.

4. The network system of claim 1, wherein the first message comprises instructions initiating an IPSec negotiation to the IP address of the first gateway, and wherein the fourth message comprises one or more of: a specific time to send a message to the IP address of the first gateway, a number of re-transmission attempts prior to reporting a failure to establish an IPSec tunnel, and a time period to wait until retransmitting the message to the IP address of the first gateway.

5. The network system of claim 4, wherein the first message includes a destination address corresponding to the second gateway.

6. The network system of claim 4, wherein the third message includes a destination address corresponding to the first gateway.

7. The network system of claim 4, wherein the second gateway retransmits the fourth message when a negotiation message is not received from the first gateway within a time period in accordance with the second controller message.

8. The network system of claim 4, wherein the first message and the third message each indicate a number of tunnels to establish including the first tunnel.

9. The network system of claim 1, wherein establishing the first tunnel enables communications between the first gateway and the second gateway without utilizing a firewall rule.

10. The network system of claim 9, wherein the firewall rule designates whether the firewall will allow or deny network traffic from a source outside of the firewall to a destination behind the firewall.

11. A method for establishing a communication coupling within a cloud computing environment between a first gateway of a first virtual private cloud network and a second gateway of a second virtual private cloud network, the first virtual private cloud network deployed behind a firewall, the method comprising:
   receiving, by the first gateway, a first message from a controller deployed within the cloud computing environment, the first message instructing the first gateway to transmit a second message to the second gateway,
   receiving, by the second gateway, a third message from the controller, the third message comprising an instruction to transmit a fourth message initiating an IPSec negotiation to an IP address of the first gateway,
   transmitting, by the first gateway, the second message to the second gateway;
   transmitting, by the second gateway, the fourth message to the first gateway;
   receiving, by the first gateway, the fourth message from the second gateway, the fourth message comprising authenticating credentials in order to begin an IPSec negotiation to establish a first tunnel between the first gateway and the second gateway in accordance with a first security protocol, wherein transmission of the second message to the second gateway opens the firewall for receipt of the fourth message from the second gateway; and
   completing, by the first gateway, the negotiation thereby causing establishment of the first tunnel.

12. The method of claim 11, wherein the first security protocol is IPSec.

13. The method of claim 11, wherein the firewall is configured to prevent network communications from a source outside the first virtual private cloud network from being received by a destination within the first virtual private cloud network.

14. The method of claim 11, wherein transmission of the second message by the first gateway is in response to receipt by the first gateway of the first message, and wherein transmission of the fourth message by the second gateway is in response to receipt by the second gateway of the third message.

15. The method of claim 14, wherein the first message includes a destination address corresponding to the second gateway.

16. The method of claim 14, wherein the third message includes a destination address corresponding to the first gateway.

17. The method of claim 14, wherein the second gateway retransmits the fourth message when a negotiation message is not received from the first gateway within a time period in accordance with the third message.

18. The method of claim 14, wherein the first message and the third message each indicate a number of tunnels to establish including the first tunnel.

19. The method of claim 11, wherein establishing the first tunnel enables communications between the first gateway and the second gateway without utilizing a firewall rule.

20. The method of claim 19, wherein the firewall rule designates whether the firewall will allow or deny network traffic from a source outside of the firewall to a destination behind the firewall.

* * * * *